(12) United States Patent
Igarashi

(10) Patent No.: US 11,119,032 B2
(45) Date of Patent: Sep. 14, 2021

(54) OPTICAL MULTIPASS CELL

(71) Applicant: TAIYO NIPPON SANSO CORPORATION, Tokyo (JP)

(72) Inventor: Takehiro Igarashi, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 0 days.

(21) Appl. No.: 16/973,251

(22) PCT Filed: May 22, 2019

(86) PCT No.: PCT/JP2019/020212
§ 371 (c)(1),
(2) Date: Dec. 8, 2020

(87) PCT Pub. No.: WO2019/239827
PCT Pub. Date: Dec. 19, 2019

(65) Prior Publication Data
US 2021/0247296 A1    Aug. 12, 2021

(30) Foreign Application Priority Data

Jun. 12, 2018  (JP) .............................. JP2018-111903

(51) Int. Cl.
*G01N 21/03* (2006.01)
*G01N 21/05* (2006.01)
*B01J 19/12* (2006.01)

(52) U.S. Cl.
CPC ............ *G01N 21/031* (2013.01); *B01J 19/12* (2013.01); *G01N 21/05* (2013.01)

(58) Field of Classification Search
USPC ........................................................ 356/246
See application file for complete search history.

(56) References Cited

U.S. PATENT DOCUMENTS 4,188,126 A    2/1980  Boisdé et al.
4,209,232 A *  6/1980  Chernin ............... G01N 21/031
                                                    356/246

(Continued)

FOREIGN PATENT DOCUMENTS

CN    103604501    2/2014
CN    104348073    2/2015

(Continued)

OTHER PUBLICATIONS

Herriott et al., "Off-Axis Paths in Spherical Mirror Interferometers", Applied Optics, Apr. 1964, vol. 3, No. 4, pp. 523 to 526 (4 pages).

(Continued)

*Primary Examiner* — Sunghee Y Gray
(74) *Attorney, Agent, or Firm* — Nixon & Vanderhye P.C.

(57) ABSTRACT

An object of the present invention is to provide an optical multipass cell that is compact and low cost, does not require the installation of a cooling mechanism around the mirror, and can increase the number of reflections of laser light, and the present invention provides an optical multipass cell comprising a container (3) to which a sample gas is supplied and a pair of concave mirrors (5 and 7) arranged so as to face each other inside the container (3), a laser beam is incident into the container (3), and the laser beam is multiply reflected between the concave mirrors (5 and 7), wherein at least one convex lens (9) is arranged on the optical path of the laser beam that is multiply reflected between the pair of concave mirrors (5 and 7) so that the central axis ($C_2$) thereof is inclined with respect to the central axis ($C_1$) of the concave mirrors (5 and 7), and an acute angle formed by the central axis ($C_2$) of the convex lens (9) and the central axis ($C_1$) of the concave mirrors (5 and 7) is equal to or less than a critical angle when the laser beam is emitted from the convex lens (9).

2 Claims, 6 Drawing Sheets

(56) References Cited

U.S. PATENT DOCUMENTS

| | | | |
|---|---|---|---|
| 4,225,232 A | 9/1980 | Boisde et al. | |
| 5,570,697 A | 11/1996 | Walker et al. | |
| 8,299,433 B2* | 10/2012 | Majewski | G01N 21/3504 |
| | | | 250/338.1 |
| 8,810,794 B2* | 8/2014 | Breviere | G01N 21/3504 |
| | | | 356/432 |
| 2009/0190128 A1 | 7/2009 | Cerni et al. | |
| 2010/0238446 A1* | 9/2010 | Akiyama | G01N 21/031 |
| | | | 356/437 |
| 2017/0307955 A1 | 10/2017 | Rabb et al. | |

FOREIGN PATENT DOCUMENTS

| | | |
|---|---|---|
| JP | 08-178839 | 7/1996 |
| JP | 2001-521628 | 11/2001 |
| JP | 2002-323442 | 11/2002 |
| JP | 2010-243270 | 10/2010 |
| JP | 2016-121905 | 7/2016 |
| RU | 2055380 C1 | 2/1996 |
| WO | 98/46935 | 10/1998 |

OTHER PUBLICATIONS

Hill et al., "Retroreflecting multipass cell for Raman scattering", Applied Optics, Jul. 1977, vol. 16, No. 7, pp. 2004-2006 (3 pages).
International Search Report for PCT/JP2019/020212 dated Jul. 30, 2019, 4 pages.
Notice of Allowance dated Jun. 7, 2021 issued in Russian Application No. 2020140469 with English translation (21 pages).

\* cited by examiner

OPTICAL MULTIPASS CELL

CROSS-REFERENCE TO RELATED APPLICATIONS

This application is the U.S. national phase of International Application No. PCT/JP2019/020212 filed May 22, 2019 which designated the U.S. and claims priority to JP 2018-111903 filed Jun. 12, 2018, the entire contents of each of which are hereby incorporated by reference.

TECHNICAL FIELD

The present invention relates to an optical multipass cell that multiply reflects laser light between a plurality of concave mirrors arranged facing each other, and particularly to an optical multipass cell used for a photoreaction or a spectroscopic analysis.

BACKGROUND ART

A photoreaction using laser light induces optical transitions between energy levels of specific molecular species. The photoreaction proceeds when a molecule that has absorbed light according to Lambert-Beefs law overcomes the potential barrier of the reaction and breaks and recombines the molecular bond. Therefore, the photoreaction rate is increased by increasing the light utilization rate, which indicates how much laser light is used for the photoreaction. In addition, an energy yield showing the result with respect to an input energy is also improved by increasing the light utilization rate. As a method of increasing the light utilization rate, there is a long optical path using light reflection or the like. As a method for efficiently realizing a long optical path, an optical multipass cell has been known in which a laser beam is repeatedly reflected by a reflecting surface such as a mirror.

In such an optical multipass cell, the presence of an obstacle in the optical path of the incident laser light may hinder the progress of the laser light. For this reason, it is not preferable to arrange an obstacle in the optical path that hinders the progress of the laser beam. Therefore, an optical multipass cell that realizes a long optical path without presenting anything in the optical path has been conventionally used.

As a typical example of an optical multipass cell, a method, in which spherical mirrors having concave reflecting surfaces are arranged facing each other so that their optical axes coincide with each other, laser light is introduced between the spherical mirrors, and incident light is multiply reflected between the opposing spherical mirrors, has widely known. Such an optical multipass cell is called a Herriott type cell (Non-Patent Document 1).

On the other hand, as a method of further increasing the number of times the laser light is reflected, for example, Patent Document 1 discloses a technology in which holding and fixing members for the concave spherical mirrors that reflect the laser beam are cooled by a cooling mechanism, stress is applied to the concave spherical mirrors, the reflection surface of the spherical mirrors is deformed by the stress, the focal length is changed, the number of reflections of the laser light is increased, and a long optical path is secured without increasing the size of the container.

PRIOR ART DOCUMENTS

Patent Documents

Patent Document 1 Japanese Unexamined Patent Application, First Publication No. 2016-121905

Non-Patent Documents

Non-Patent Document 1 D. Herriott, H. Kogelnik and R. Kornpfner, Applied Optics, Vol. 3, No 4, 1964, pp. 523-526

SUMMARY OF INVENTION

Problem to be Solved by the Invention

However, the optical multipass cell that deforms the concave spherical mirror (hereinafter referred to as "concave mirror") requires the cooling mechanism for cooling the concave mirrors, which causes a problem in that the optical multipass cell becomes large and costs a lot for cooling. Furthermore, if there is a component having a high condensation temperature such as moisture around the cooled area, there is a problem in that dew condensation and frost formation will occur (in particular, dew condensation and frost formation on the mirror surfaces cause significant attenuation of the laser beam, leading to performance deterioration).

Therefore, there has been a demand for a technique that is compact and low cost, and that increases the number of times of reflection of laser light that does not require the installation of a cooling mechanism around the mirror.

The present invention has been made to solve the problems above, and an object of the present invention is to provide an optical multipass cell that is compact and low cost, does not require the installation of a cooling mechanism around the mirror, and can increase the number of reflections of laser light.

Means for Solving the Problem

The optical multipass cell according to the present invention is an optical multipass cell including a container to which a sample gas is supplied and a pair of concave mirrors arranged so as to face each other inside the container, a laser beam is incident into the container, and the laser beam is multiply reflected between the concave mirrors, wherein at least one convex lens is arranged on the optical path of the laser beam that is multiply reflected between the pair of concave mirrors so that the central axis thereof is inclined with respect to the central axis of the concave mirrors, and an acute angle formed by the central axis of the convex lens and the central axis of the concave mirrors is equal to or less than a critical angle when the laser beam is emitted from the convex lens.

Effects of the Invention

According to the present invention, it is possible to provide an optical multipass cell which is small in size and low in cost, does not require the installation of a cooling mechanism around the mirror, and can increase the number of times the laser beam is reflected.

DETAILED DESCRIPTION OF THE PREFERRED EMBODIMENTS

The optical multipass cell according to an embodiment of the present invention will be described below with reference to FIGS. 1 and 2.

Figure 1:
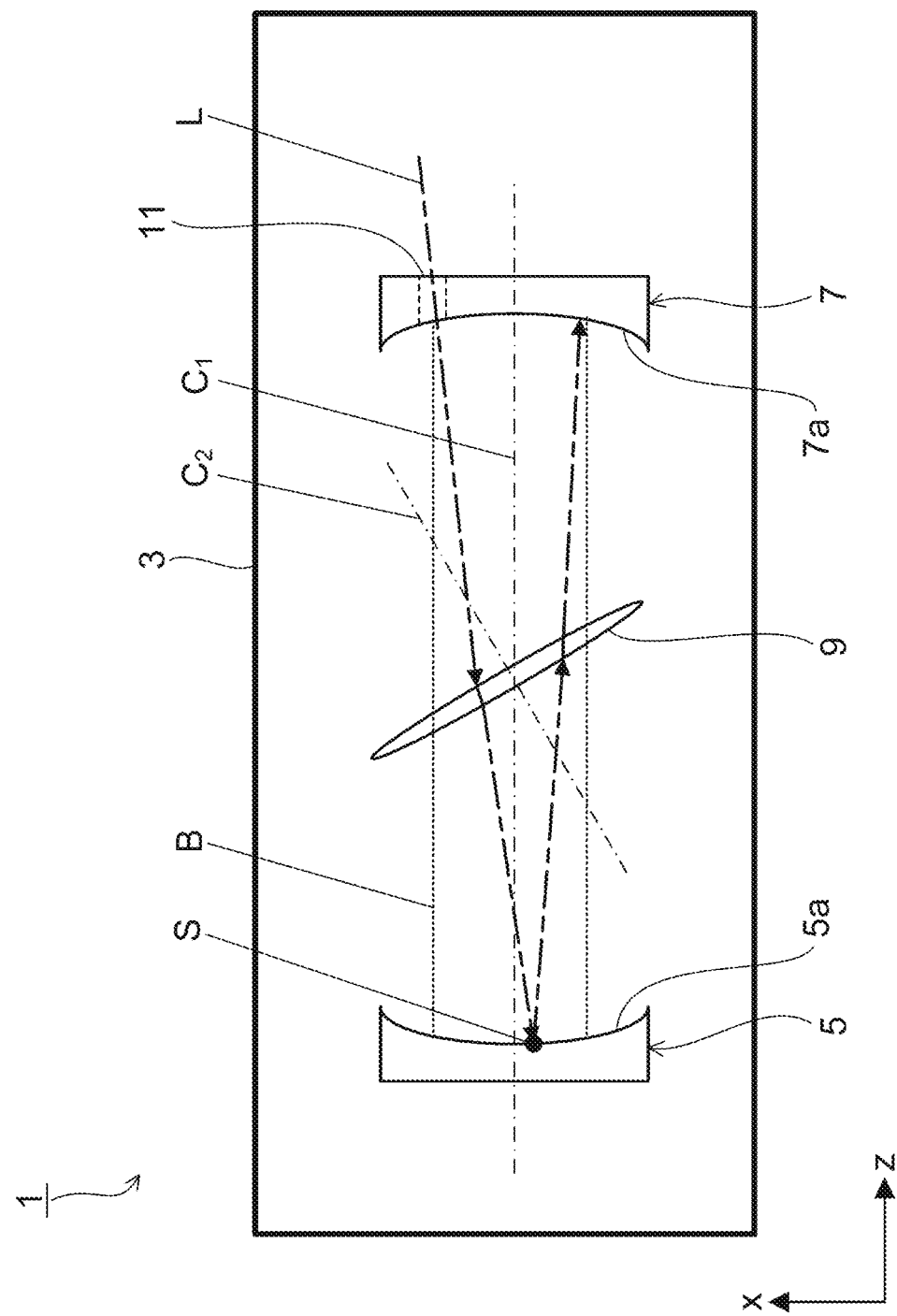
FIG. 1 is a diagram showing a configuration of an optical multipass cell according to an embodiment of the present invention.

As shown in FIG. 1, an optical multipass cell 1 according to the present embodiment includes a container 3, concave mirrors 5 and 7, and a convex lens 9. The optical multipass cell 1 can be used for a photoreaction such as derivation of an oxygen isotope concentrated gas by irradiating ozone with a laser beam disclosed in a known reference (Japanese Unexamined Patent Application, First Publication No. 2008-73673).

Hereinafter, each configuration of the optical multipass cell 1 according to the present embodiment will be described.

In the present description and the drawings, elements having substantially the same function and configuration are designated by the same reference numerals and duplicate description is omitted.

In addition, the drawings used in the following description may be shown by enlarging the characteristic parts for convenience in order to make the features easy to understand, and the dimensions and ratios of each component are the same as the actual ones.

A sample gas is supplied into the container 3. A pair of concave mirrors 5 and 7 and a convex lens 9 are housed inside the container 3. When the optical multipass cell 1 is used for a photoreaction or a spectroscopic analysis, the container 3 has a structure in which a sample gas, which is a substance to be irradiated with laser light, does not leak.

The concave mirrors 5 and 7 have concave reflecting surfaces 5a and 7a, respectively. The reflecting surface 5a and the reflecting surface 7a are arranged so as to face each other. In the present embodiment, as shown in FIG. 1, the pair of concave mirrors 5 and 7 are arranged so as to face each other so that the central axes (optical axes) $C_1$ of the reflecting surfaces 5a and 7a are aligned with each other. Here, the z-axis shown in FIG. 1 is an axis in the direction of the central axis $C_1$ of the concave mirrors 5 and 7, and the x-axis is an axis in the direction orthogonal to the central axis $C_1$ (the same applies to FIGS. 2 and 3 described later).

The concave mirror 7 is provided with an incident hole 11 for introducing the laser beam L to be multiply reflected between the concave mirrors 5 and 7.

The concave mirrors 5 and 7 may be made of glass or a metal such as copper or aluminum, although the material does not matter.

The convex lens 9 is arranged on the optical path of the laser beam L that is multiply reflected between the concave mirror 5 and the concave mirror 7, and bends the optical path of the laser beam L incident on the convex lens 9.

The convex lens 9 is arranged so that its central axis (optical axis) $C_2$ is tilted with respect to the central axis $C_1$ of the concave mirrors 5 and 7. Here, the arrangement so as to be tilted means that an acute angle formed by the central axis $C_2$ of the convex lens 9 and the central axis $C_1$ of the concave mirrors 5 and 7 (hereinafter, may be referred to as "tilt angle") is an angle other than 0° or 90°. Therefore, it is preferable that the convex lens 9 be held by a lens holder or the like of which the tilt angle can be adjusted.

The tilt angle is the critical angle of the convex lens 9 or less, and is preferably 0° or more and the critical angle or less, and more preferably 15° or more and the critical angle or less.

The critical angle is calculated by the following formula. $n_1$ is the refractive index of the convex lens 9, $n_2$ is the refractive index of the sample gas, and $\theta_c$ is the critical angle.

$$\theta_C = \sin^{-1}\frac{n_2}{n_1}$$

By arranging at least one convex lens 9 so as to be inclined in this way, the spot pattern of the spot S of the laser beam L on the concave mirrors 5 and 7 becomes a Lissajous shape. This makes it easier to obtain a pattern shape using the entire reflective surfaces 5a and 7a of the concave mirrors 5 and 7. As a result, according to the optical multipass cell 1 of the present embodiment, it is possible to increase the number of times the laser beam L is reflected between the concave mirrors 5 and 7 and increase the optical path length. Cost reduction can be realized without the need for a cooling mechanism for cooling the concave mirrors 5 and 7.

Although one convex lens 9 is arranged in the optical multipass cell 1 shown in FIG. 1, the present invention does not particularly limit the number of convex lenses to be arranged.

Figure 2:
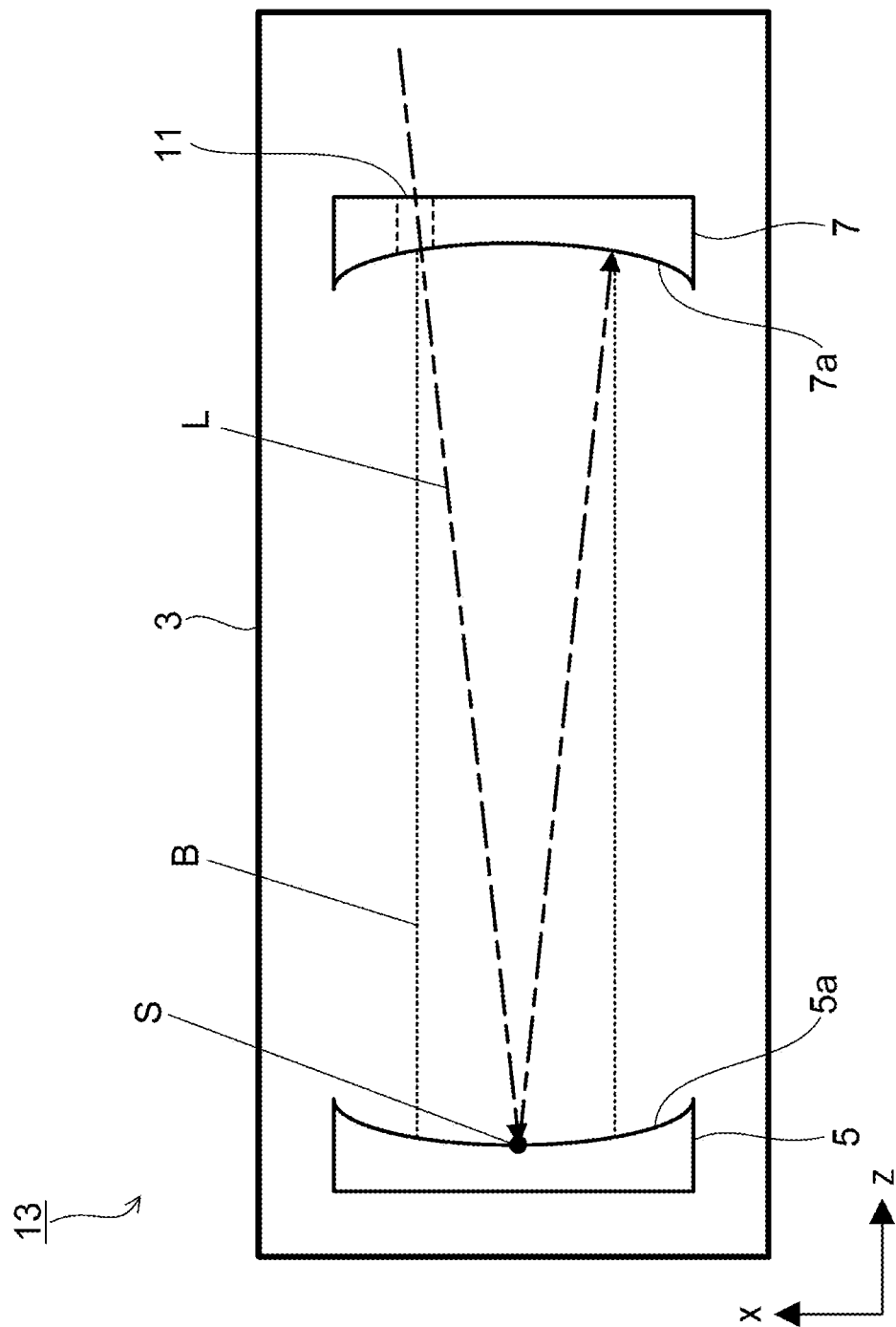
FIG. 2 is a diagram showing a configuration of a conventional optical multipass cell, which is a normal Herriott type cell.

The size of the convex lens 9 is larger than the diameter of the beam bundle B of the laser beam L that is multiply reflected between the concave mirrors 5 and 7 in the normal Herriott type optical multipass cell 13 in which the convex lens 9 is not arranged as shown in FIG. 2.

Further, the position in which the convex lens 9 is arranged is not particularly limited. However, for example, if the convex lens 9 is arranged too close to one of the concave mirrors 5 and 7, the laser beam L constituting the beam bundle B may deviate from the periphery of the other concave mirrors 7 and 5, and multiple reflections may not be obtained. Therefore, it is desirable to arrange the convex lens 9 near the center between the concave mirror 5 and the concave mirror 7. Further, in FIG. 1, the center of the convex lens 9 is located on the central axis $C_1$ of the concave mirrors 5 and 7, but the convex lens 9 may be arranged such that the center of the convex lens 9 is offset in the x-axis direction of FIG. 1.

The type of the convex lens 9 may be either a biconvex lens or a plano-convex lens that can obtain a positive focal length. However, when a convex lens 9 having an excessively large focal length is used, the laser light L transmitted through the convex lens 9 may pass outside of the periphery of the concave mirror 5 or 7, and multiple reflections may not continue. The focal length of the convex lens 9 may be appropriately selected so that the multiple reflection of the light L can be continued.

Note that FIG. 1 shows an optical multipass cell 1 including the container 3, the concave mirrors 5 and 7, and the convex lens 9. In addition, an optical multipass cell 21 shown in FIG. 3 can be exemplified as another embodiment of the present invention.

The optical multipass cell 21 includes a mirror holder 23 which is configured to hold the concave mirrors 5 and 7, a mirror adjustment mechanism 25 that adjusts the swing and tilt directions of the concave mirrors 5 and 7, a lens holder 27 that holds the tilt angle of the convex lens 9 in an adjustable manner, an incident window 29 to allow the laser beam L to be incident into the container 3, a gas inlet 31 for the sample gas, and a gas outlet 33 for the sample gas, in addition to the container 3, the concave mirrors 5 and 7, and the convex lens 9.

Further, in the optical multipass cell 21, a laser light source 35 is provided outside the container 3. The laser light L emitted from the laser light source 35 passes through the incident window 29 and the incident hole 11 and is incident between the concave mirrors 5 and 7. Then, the laser beam L multiply reflected between the concave mirrors 5 and 7 passes through the incident hole 11 and the incident window 29 and is emitted to the outside of the container 3.

Figure 3:
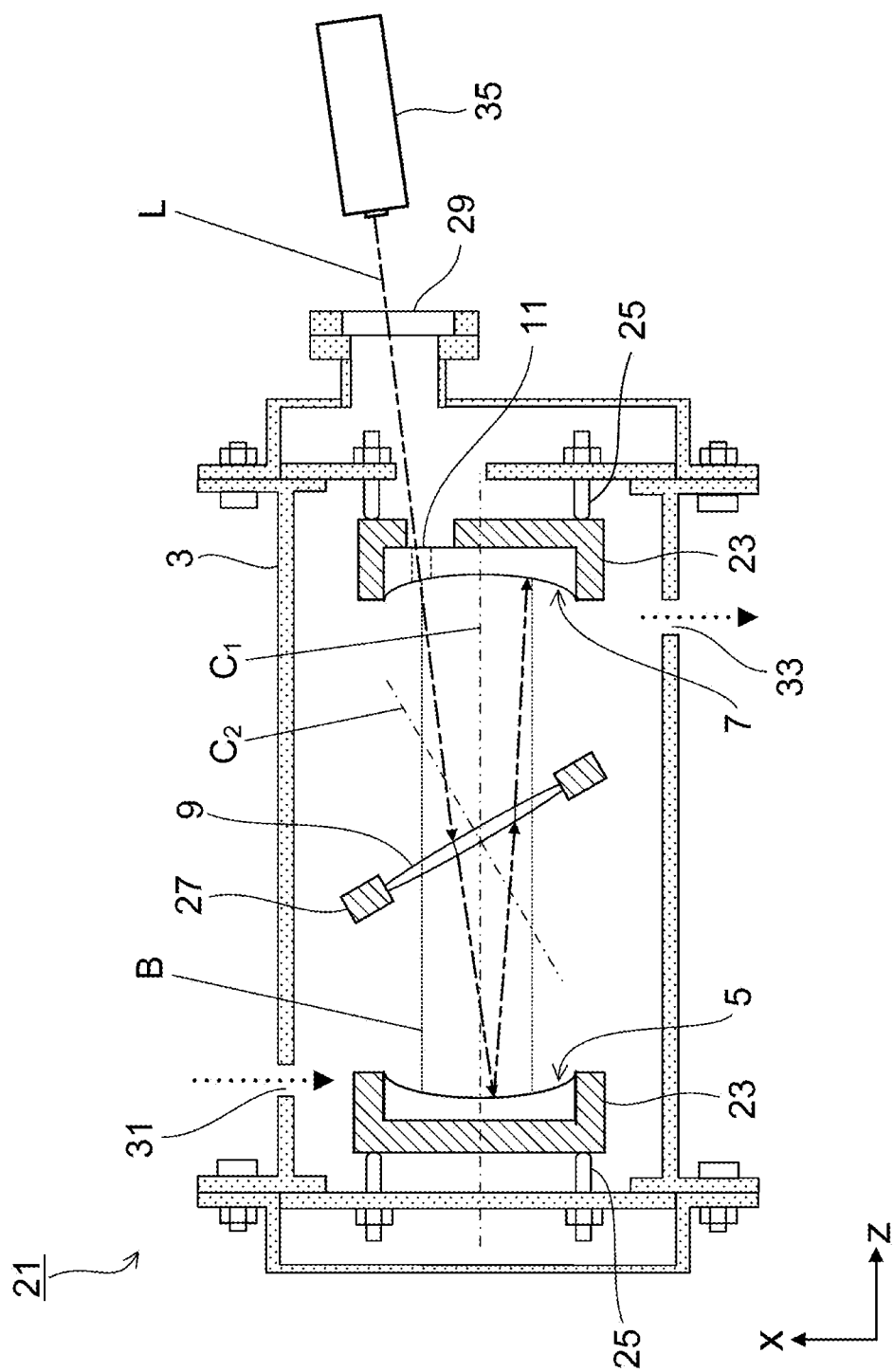
FIG. 3 is a diagram showing a configuration of an optical multipass cell according to another embodiment of the present invention.

In the optical multipass cell 1 shown in FIG. 1 and the optical multipass cell 21 shown in FIG. 3, one incident hole 11 is provided with the concave mirror 7. However, a plurality of the incident holes 11 may be provided, or the incident hole 11 may be further provided in the concave mirror 5.

Further, a method for introducing the laser beam in the optical multipass cell according to the present invention is not limited to the method of passing the laser beam through the incident hole 11 provided in the concave mirror 5 or 7. For example, a guide mirror may be separately installed between the concave mirrors arranged opposite to each other, and the laser beam may be incident on the guide mirror and reflected on the concave mirror to introduce the laser beam (for example, FIG. 1 in Patent Document 1).

Further, in the optical multipass cells 1 and 21, the emission hole (not shown) for taking out the laser light L to the outside of the container 3 and the incident hole 11 are common, and the laser light L which is multiply reflected between the concave mirrors 5 and 7 passes through the incident hole 11 and exits to the outside of the container 3. However, the container 3 may be provided with an emission hole separately from the incident hole 11. Regardless of whether the emission hole is provided in the concave mirror or the container, the position and the number of emission holes can be appropriately changed according to the required optical path length and the position and the number of spots.

As described above, when the optical multipass cell according to the present invention is used in spectroscopic analysis, the emission hole for emitting multiple reflected laser light may be provided, and the laser light passing through the emission hole may be taken out of the container. However, when the optical multipass cell according to the present invention is used in a photoreaction, it is not necessary to take out the laser beam after multiple reflections to the outside of the container, so that the container does not need to have the emission hole.

EXAMPLES

Experiments were conducted to confirm the action and effects of the optical multipass cell of the present invention, and the results will be described below.

Example 1

The experiment was carried out using the optical multipass cell 21 shown in FIG. 3.

In the optical multipass cell 21, the concave mirrors 5 and 7, and the convex lens 9 were arranged inside the container 3.

As the concave mirrors 5 and 7, a concave mirror (manufactured by Thorlabs, CM750-500-E02, focal length f: 500 mm, outer diameter φ: 75.0 mm) was used. The incident hole 11 having a diameter of 4.0 mm was provided at a position about 30 mm above the central axis $C_1$ of the concave mirror 7. The concave mirrors 5 and 7 were held by the mirror holder 23 so that the central axis $C_1$ of the concave mirror 5 and the central axis $C_1$ of the concave mirror 7 was aligned and the distance between the concave mirror 5 and the concave mirror 7 (distance between the concave mirrors) was 900 mm.

As the convex lens 9, a biconvex lens (manufactured by Thorlabs, LA1779-B, focal length f: 1000 mm, outer diameter φ: 50.8 mm) was used. The convex lens 9 was held by the lens holder 27 so that the inclination angle can be adjusted with respect to the central axis $C_1$ of the concave mirrors 5 and 7, and was arranged at a position 450 mm away from concave mirrors 5 and 7, that is, the position near the center between the concave mirrors 5 and 7. The acute angle between the central axis $C_1$ and the central axis $C_2$ was set to 15.0°.

The refractive index of the convex lens 9 used in this embodiment was 1.515. Since the refractive index of the sample gas (air) is about 1.00027 (atmospheric pressure, 25° C.), the critical angle $\theta_C$ at which total reflection occurs when the laser light is emitted from the convex lens 9 is about 41.3°.

Example 2

An optical multipass cell was obtained in the same manner as in Example 1 except that the acute angle between the central axis $C_1$ and the central axis $C_2$ was set to 18.0°.

Example 3

An optical multipass cell was obtained in the same manner as in Example 1 except that the acute angle between the central axis $C_1$ and the central axis $C_2$ was set to 41.0°.

Comparative Example 1

An optical multipass cell was obtained in the same manner as in Example 1 except that the convex lens 9 was not arranged.

Comparative Example 2

An optical multipass cell was obtained in the same manner as in Example 1 except that the acute angle between the central axis $C_1$ and the central axis $C_2$ was set to 0°. At this time, the laser reflected light (stray light) on the lens surface was reflected on the surface of the concave mirror.

Comparative Example 3

An optical multipass cell was obtained in the same manner as in Example 1 except that the acute angle between the central axis $C_1$ and the central axis $C_2$ was set to 50.0°.

The obtained optical multipass cell was evaluated by observing the spot patterns in the concave mirrors 5 and 7 from an observation window (not shown) provided in the container 3. Here, the number of spots was measured by photographing the spot pattern in the concave mirror 5 using a camera having appropriate exposure characteristics.

Figure 4:
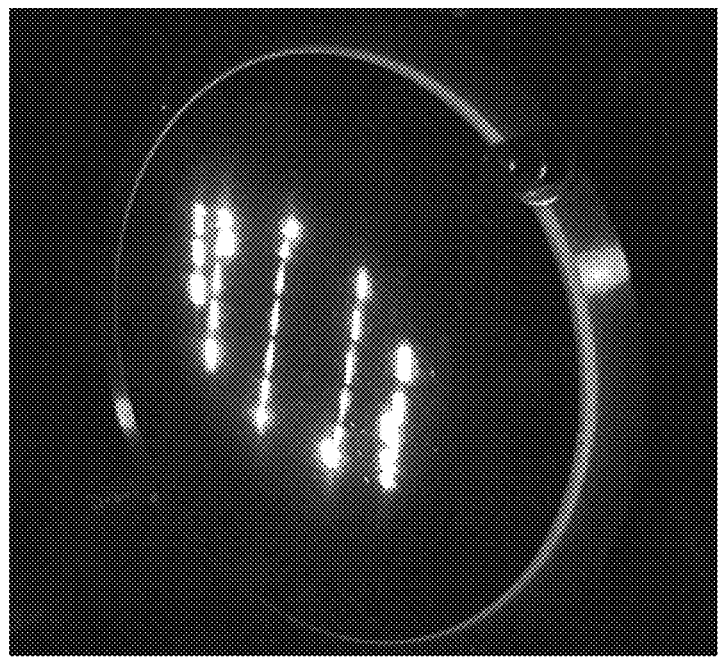
FIG. 4 is a diagram showing a spot pattern in a concave mirror when laser light is incident in an optical multipass cell and is multiply reflected in an embodiment of the present invention (Example 1).
Figure 5:
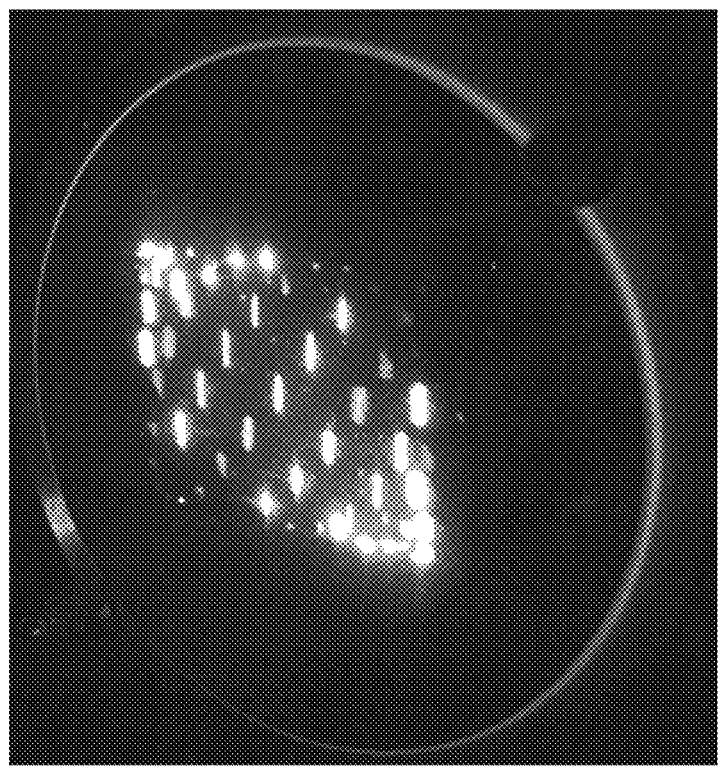
FIG. 5 is a diagram showing a spot pattern in a concave mirror when laser light is incident in an optical multipass cell and is multiply reflected in an embodiment of the present invention (Example 2).
Figure 6:
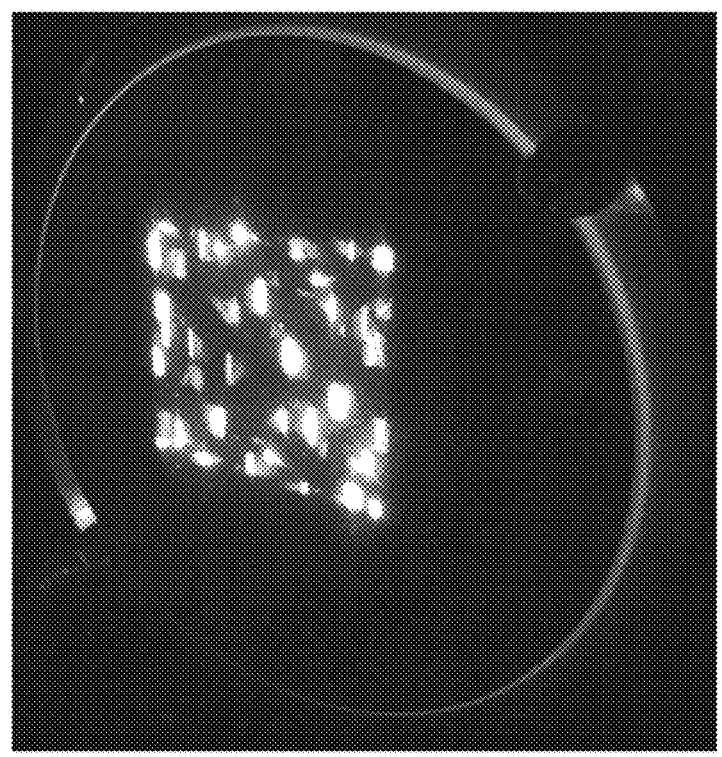
FIG. 6 is a diagram showing a spot pattern in a concave mirror when laser light is incident in an optical multipass cell and is multiply reflected in an embodiment of the present invention (Example 3).
Figure 7:
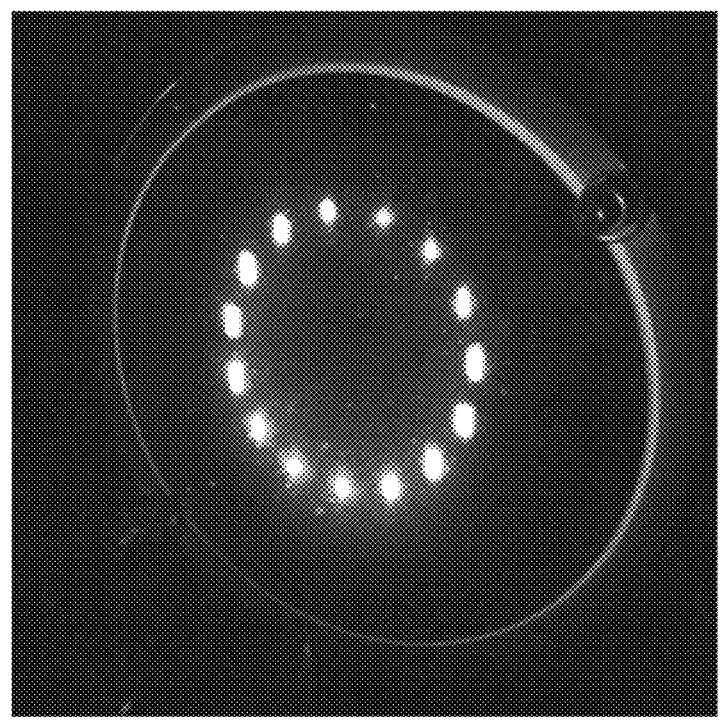
FIG. 7 is a diagram showing a spot pattern in a concave mirror when laser light is incident in an optical multipass cell and is multiply reflected for comparison (Comparative Example 1).
Figure 8:
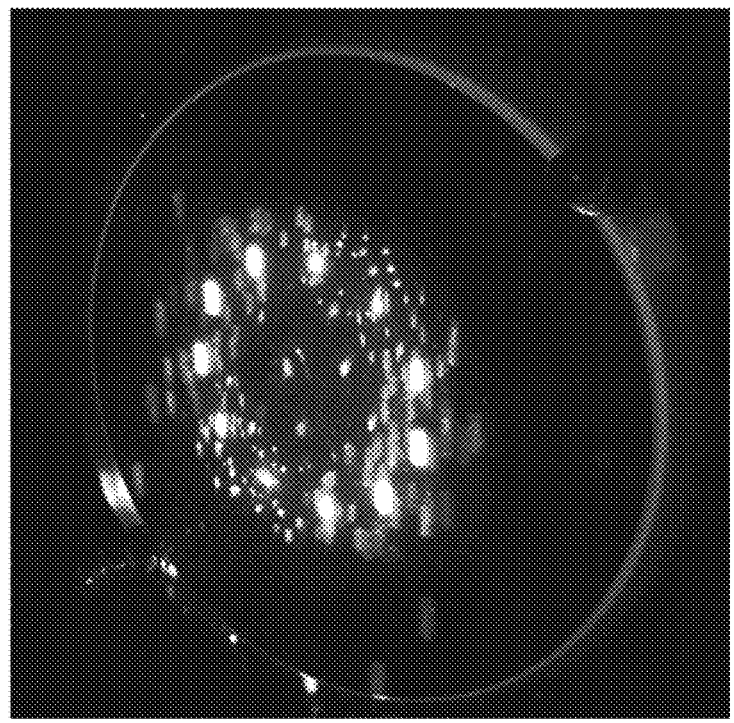
FIG. 8 is a diagram showing a spot pattern in a concave mirror when laser light is incident in an optical multipass cell and is multiply reflected for comparison (Comparative Example 2).
Figure 9:
FIG. 9 is a diagram showing a spot pattern in a concave mirror when laser light is incident in an optical multipass cell and is multiply reflected for comparison (Comparative Example 3).

FIGS. 4 to 6 show the spot patterns photographed in Examples 1 to 3, and FIGS. 7 to 9 show the spot patterns photographed in Comparative Examples 1 to 3. Table 1 shows a summary of these results.

TABLE 1

| | | | Evaluation results | |
|---|---|---|---|---|
| | Presence or absence of convex lens | Acute angle between central axis $C_1$ and central axis $C_2$ (°) | Number of spots (pieces) | Figure number |
| Example 1 | Presence | 15.0 | 27 | FIG. 4 |
| Example 2 | Presence | 18.0 | 46 | FIG. 5 |
| Example 3 | Presence | 41.0 | 39 | FIG. 6 |
| Comparative Example 1 | Absence | — | 15 | FIG. 7 |
| Comparative Example 2 | Presence | 0 | 11 | FIG. 8 |
| Comparative Example 3 | Presence | 50.0 | 2 | FIG. 9 |

First, the results of Examples 1 to 3 will be described.

The number of spots increased when the convex lens 9 was tilted so that the angle formed by the central axis $C_2$ of the convex lens 9 and the central axis $C_1$ of the concave mirrors 5 and 7 was equal to or less than the critical angle. Then, in Examples 1 to 3, as shown in FIGS. 4 to 6, the spot pattern changed to a Lissajous shape while maintaining the multiple reflections in the concave mirrors 5 and 7.

In particular, in Example 2 in which the convex lens 9 was tilted at an angle of 18.0°, at least 46 or more spots were confirmed. This is more than double the number of spots in the spot pattern (FIG. 7) in Comparative Example 1 in which the convex lens was not arranged.

The spot patterns shown in FIGS. 4 to 6 were similar to the Lissajous spot pattern obtained by an astigmatism Herriott type cell or the like. It is considered that the Lissajous spot pattern was obtained in the optical multipass cells 21 of Examples 1 to 3 because the laser beam L between the concave mirrors 5 and 7 which originally takes a straight optical path was bent by the convex lens 9.

Next, the results of Comparative Examples 1 to 3 will be described.

In the optical multipass cell of Comparative Example 1 in which the convex lens 9 was not arranged, as shown in FIG. 7, the spot pattern was concentric and the number of spots was 15.

As shown in FIG. 8, in Comparative Example 2 in which the convex lens 9 was arranged so that the acute angle formed by the central axis $C_1$ and the central axis $C_2$ was 0°, the laser beam L transmitted through the convex lens 9 made a circular spot pattern on the surface of the concave mirror 5 in the same manner as in Comparative Example 1, and the number of spots was 11. Further, the laser light reflected by the surface of the convex lens 9 was reflected around the circular spot. This reflected light has low power and it is difficult to determine the optical path, so that it cannot be used effectively.

Further, in Comparative Example 3 in which the convex lens 9 was further tilted from the state shown in FIG. 6 and the formed angle (tilt angle) was larger than the critical angle, a part of the beam bundle B caused total reflection on the surface of the convex lens 9. Therefore, as shown in FIG. 9, the number of spots decreased.

The results above shows that by bending the optical path of the laser beam L with the convex lens 9, a Lissajous spot pattern can be formed and the number of spots in the spot pattern can be increased.

Next, using the optical multipass cells of Example 2 and Comparative Example 1, the increase in the optical path length due to the increase in the number of spots and the effect of increasing the photoreaction rate due to the increase in the optical path length were examined.

Increasing the number of spots is synonymous with increasing the optical path length without changing the distance between the concave mirrors 5 and 7 (distance between the concave mirrors). The optical path length between the concave mirrors 5 and 7 can be estimated by the product of the number of spots and the distance between the concave mirrors.

Therefore, the performance improvement when the optical multipass cell 21 is used in the photoreaction is estimated as follows. In the examination here, it is assumed that the laser light L is CW light, the incident light quantity $I_0$ incident in the container 3 is constant, and the inside of the container 3 in which the concave mirrors 5 and 7 and the convex lens 9 are installed in vacuum.

The effect on the photoreaction rate when the laser light is multiply reflected can be evaluated by using the integrated light quantity $I_{total}$ obtained by the following equation (1).

$$I_{total} = I_0 + I_0 R + I_0 R^2 + I_0 R^3 + \ldots + I_0 R^n \quad (1)$$

$$= \frac{1 - R^{n+1}}{1 - R} I_0$$

$I_0$ is the incident light quantity first incident in the container, R is the mirror reflection coefficient, 2, 3, . . . , and n is the number of reflections by the concave mirrors 5 and 7. The integrated light quantity $I_{total}$ in the container 3 is the integrated value of the light quantity for each reflection. The larger the integrated light quantity is, the larger the absorption amount of the sample gas irradiated with the laser beam according to the Lambert-Beer law, and an increase in the photoreaction rate can be expected.

In the case of the optical multipass cell of Comparative Example 1, which is a normal Herriott type cell, the mirror reflection coefficient R in the equation (1) is the reflection coefficient of the concave mirrors 5 and 7.

However, in the case of the optical multipass cell 21 of Example 2 according to the present invention, it is necessary to consider the light quantity loss (=1-transmittance) due to the convex lens 9. Therefore, the mirror reflection coefficient R in the equation (1) was calculated by R=(reflection coefficient of the concave mirror)×(transmittance of the convex lens).

The reflection coefficient of the concave mirrors 5 and 7 used in Examples was 99.5% in actual measurement, and the transmittance of the convex lens 9 was 99.2% in actual measurement. The reflected light on the surface of the convex lens 9 was not taken into consideration, and the thickness of the convex lens 9 was made thin enough to be negligible as compared with the distance between the concave mirrors.

Table 2 shows the results of calculating the integrated light quantity $I_{total}$ in the container when the optical multipass cell 21 in Example 2 and the optical multipass cell 13 in Comparative Example 1 were used. The number of reflections n is the sum of the number of spots on the concave mirrors 5 and 7. However, in the concave mirror 7 having the incident hole 11, the laser light L is finally emitted from the incident hole 11 to the outside of the container 3, so that the number of spots is one smaller than the number of spots on the concave mirror 5.

TABLE 2

| | Incident light quantity $I_0$ mW | Reflection coefficient — | Number of reflection n times | Integrated light quantity $I_{total}$ in the container mW |
|---|---|---|---|---|
| Comparative Example 1 | 100 | 0.995 | 29 | 2792 |
| Example 2 | 100 | 0.987 | 91 | 5392 |

In Table 2, "Comparative Example 1" is a comparative example in which an optical multipass cell 13 without a convex lens was used, and "Example 2" is an example in which an optical multipass cell 21 with a convex lens 9 was used.

As shown in Table 2, the integrated light quantity $I_{total}$ in the container was 2,792 mW in Comparative Example 2, whereas the integrated light quantity $I_{total}$ in the container was 5,392 mW in Example 2. It can be understood that the integrated light quantity $I_{total}$ in the container is increased by disposing the convex lens 9. Assuming that the light reaction rate is proportional to the integrated light quantity $I_{total}$ in the container, the photoreaction rate of the optical multipass cell 21 according to Example 2 is expected to increase by 5,392 mW/2,792 mW≈1.9 times as compared with the optical multipass cell according to Comparative Example 1.

As a result, for example, it can be expected that when the optical multipass cell 21 according to the present invention is used in the generation of oxygen isotope concentrated gas by irradiating ozone with laser light disclosed in the reference above, the generation rate of oxygen isotope concentrated gas will be 1.9 times higher than that when the conventional optical multipass cell is used.

As explained above, it is clear that according to the optical multipass cell of the present invention, by arranging the convex lens on the optical path between a pair of concave mirrors that multiply reflects laser light, a Lissajous characteristic spot pattern can be obtained in the concave mirror, and the number of reflections can be increased. As a result, it is demonstrated that the number of times the laser beam is reflected by the concave mirror increases, so that the optical path length can be more than twice as long as that of a normal Herriott type cell of the same size, and the reaction rate of the photoreaction by the laser beam can be increased.

EXPLANATION OF REFERENCE NUMERALS

1 optical multipass cell
3 container
5, 7 concave mirror
5a, 7a reflective surface
9 convex lens
11 incident hole
13 optical multipass cell
21 optical multipass cell
23 mirror holder
25 mirror adjustment mechanism
27 lens holder
29 incident window
31 gas inlet
33 gas outlet
35 laser light source
B beam bundle
$C_1$ central axis (concave mirror)
$C_2$ central axis (convex lens)
L laser light
S spot

The invention claimed is:

1. An optical multipass cell comprising a container to which a sample gas is supplied and a pair of concave mirrors arranged so as to face each other inside the container, a laser beam is incident into the container, and the laser beam is multiply reflected between the concave mirrors,
    wherein at least one convex lens is arranged on the optical path of the laser beam that is multiply reflected between the pair of concave mirrors so that the central axis thereof is inclined with respect to the central axis of the concave mirrors, and
    an acute angle formed by the central axis of the convex lens and the central axis of the concave mirrors is equal to or less than a critical angle between the convex lens and the sample gas.

2. The optical multipass cell according to claim 1, wherein the acute angle is 15.0° or more.

* * * * *